March 7, 1961 W. E. RUDISCH 2,973,851
CLUTCHES
Filed April 30, 1959
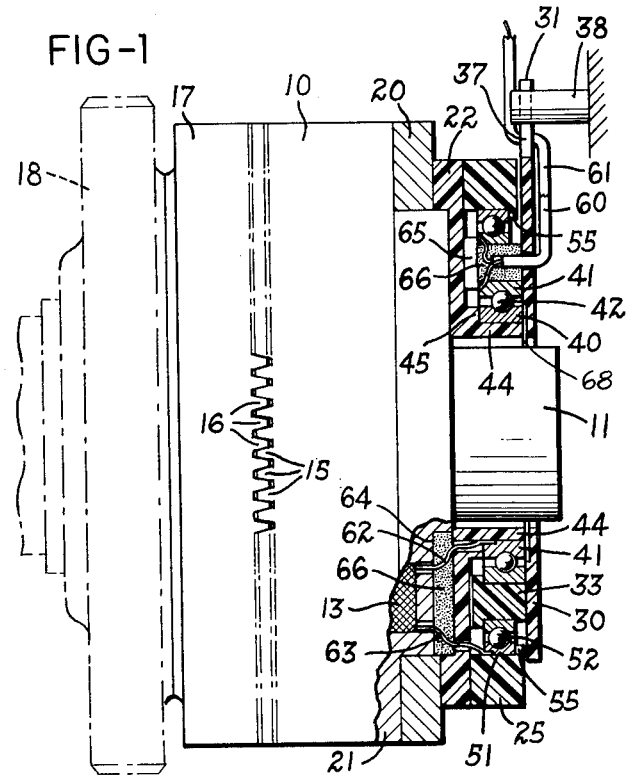
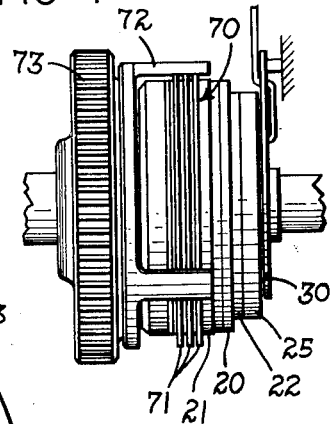
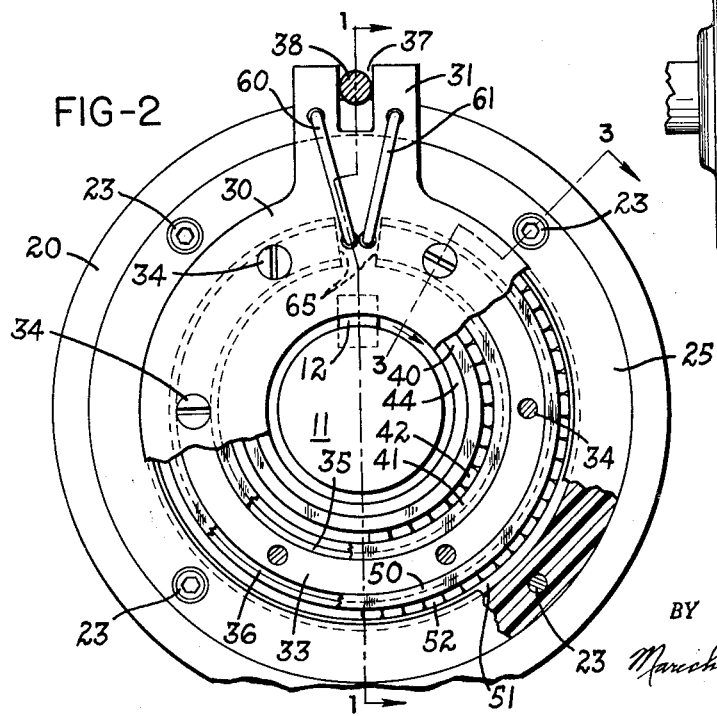
INVENTOR.
WALTER E. RUDISCH
BY
Marechal, Biebel, French & Bugg
ATTORNEYS

United States Patent Office 2,973,851
Patented Mar. 7, 1961

2,973,851

CLUTCHES

Walter Ernst Rudisch, Dayton, Ohio, assignor, by mesne assignments, to The Bendix Corporation, a corporation of Delaware Filed Apr. 30, 1959, Ser. No. 809,935

8 Claims. (Cl. 192—84)

This invention relates to electromagnetic clutches, and more particularly to an anti-friction device for transmitting energizing current through the operating coil of the rotating magnet body of an electromagnetic clutch.

In clutches of this type in which the energizing coil is carried by a rotating magnet body, suitable connections must be made for effecting transmission of the energizing current from a stationary source into the rotating coil. A common procedure for this purpose involves the use of stationary brushes riding on the surface of a slip ring carried by the magnet body, and while this type of connection is widely used and acceptable in many situations, it can require frequent inspection and replacement of the brushes which are often difficult to effect when the clutch is not easily accessible. For example, many machine tools such as milling machines and the like may use a considerable number of relatively small clutches which are arranged for remote operation and are relatively inaccessible from the standpoint of economical inspection and maintenance.

It is also necessary in clutches of the above type to provide for completion of the energizing circuit, and while this may be done by grounding one end of the coil through the shaft on which the clutch is mounted, this is not a desirable arrangement in many installations. It is possible to complete the circuit through a second slip ring and associated brushes, and this is frequently done, but this procedure is subject to the same disadvantages already noted with respect to maintenance of the brushes.

The present invention is an improvement over the device illustrated and set forth in my copending application, Serial No. 730,840, filed April 25, 1958.

It is a primary object of the present invention to provide improved apparatus for transmitting energizing current through the operating coil of the rotating magnet body of an electromagnetic clutch which embodies a pair of anti-friction bearings each having one race secured in fixed relation to the magnet body and serving as an electrical connector for one side or the other of the energizing circuit for the magnet coil, with the other race of each bearing serving as a stationary connector to which the external power leads are connected, and with the anti-friction elements of each bearing serving as electrical connectors between the complementary races thereof.

Another object of the invention is to provide electrical conducting apparatus for an electromagnetic clutch as outlined above in which the complementary races of each bearing are subjected to continuous thrust loads in use in such manner as to establish assured maintained electrical contact between each pair of races and the associated balls or other anti-friction elements therebetween.

It is also an object of the invention to provide electrical conducting apparatus as outlined above which is readily produced as an attachment for the magnet body of an existing electromagnetic clutch and which eliminates the requirement for slip rings or the like with the existing clutch.

Additional objects and advantages of the invention will be apparent from the following description, the accompanying drawing and the appended claims.

In the drawing—

Fig. 1 is a view partly in side elevation and partly in section on the line 1—1 of Fig. 2 illustrating electrical conducting apparatus in accordance with the invention as applied to the rotating magnet body of an electromagnetic clutch;

Fig. 2 is a view looking from right to left in Fig. 1 with parts broken away at different levels to illustrate details of internal construction;

Fig. 3 is a fragmentary section on the line 3—3 of Fig. 2; and

Fig. 4 is an elevational view on a smaller scale illustrating the application of the invention to another type of clutch.

Referring to the drawing, which illustrates preferred embodiments of the invention, Fig. 1 shows the application of the invention to an electromagnetic tooth clutch of the type disclosed in my Patent No. 2,875,876, issued March 3, 1959, now assigned to the assignee of this application. In this clutch, the magnet body 10 rotates with the shaft 11, as indicated by the key 12, and incorporates the energizing coil 13. In the engaged condition of the clutch, axially projecting teeth 15 on the magnet body 10 mesh with complementary teeth 16 on the armature plate assembly 17 which is in turn attached to the driven member represented by the gear 18. The present invention is directed to an attachment for the magnet body by means of which the energizing current is transmitted through the coil 13 without the necessity for slip rings or brushes.

The part 20 in Fig. 1 is shown as an adapter ring shrunk or otherwise rigidly secured on the magnet body 10, and it can equally well be an integral part of the magnet body 10 if the latter is constructed initially for use with the connecting attachment of the invention. An adapter ring 20 is particularly useful if the magnet body 10 is a part on an existing clutch which was originally constructed with a shoulder 21 thereon for receiving one or more slip rings. The attachment of the invention includes a main annular holder 22 of non-conducting material, such for example as a molded phenolic resin, which is secured to the magnet body 10 by means of a plurality of cap screws 23 threaded into the adapter ring 20 and also carrying an outer ring 25 of non-conducting material. The parts 22 and 25 therefore rotate with the magnet body 10 in use.

The attachment also includes stationary components comprising an annular plate 30 of non-conducting material, which includes a radially projecting handle portion 31, and a ring member 33 of non-conducting material which is secured to the disc 30 by screws 34 and which is T-shaped in section to provide radial flanges 35 and 36 thereon. The handle portion 31 is shown as forked to provide a slot 37 therein, and this slot serves as a convenient means of holding the plate 30 stationary by fitting around a suitable projection such as the pin 38 carried by a stationary part such as the case of the transmission which includes this clutch.

The attachment of the invention also includes a pair of inner and outer anti-friction bearings arranged in concentric relation on the holder 22. The inner bearing includes inner and outer races 40 and 41 and anti-friction balls 42, and it is mounted on the cylindrical pilot portion 44 of the holder 22 with the axial inner edge of the race 40 abutting a shoulder portion 45 of the holder 22. The outer race 41 is clamped between the plate 30 and the flange 35 on the ring member 33.

The outer bearing similarly includes inner and outer races 50 and 51 and balls 52. The axially inner edge of the inner race 50 abuts the radially extending flange 36 on the T-shaped ring member 33. The outer race 51 of this bearing is retained in position by a radially inwardly extending flange 55 on the ring 25. With this arrangement, therefore, the races 41 and 50 are secured together in insulated relation and to the stationary parts of the attachment, while the other races 40 and 51 are free to rotate with the magnet body 10.

The electrical leads 60 and 61 are guided to the clutch by means of the radially projecting handle portion 31 of the stationary plate 30. The lead 60 is shown in Fig. 1 as connected to the stationary outer race 41 of the inner bearing, and the rotating inner race 40 of this bearing is similarly shown at 62 as connected with one end of the magnet coil 13. The other lead 61 is similarly connected to the stationary inner race 50 of the outer bearing, and the rotating outer race 51 of the bearing is shown in Fig. 1 as connected at 63 with the other end of the magnet coil 13. In order to facilitate the making of these connections and also to protect them after having been made, the magnet body is slotted at 64 and the ring member 33 may conveniently have a small section thereof cut out as indicated at 65 in Fig. 2, and after the connections have been made, these slots may be filled with a suitable insulating adhesive such as epoxy resin as indicated at 66 in Fig. 1.

It is important for the purposes of the invention that proper electrical connections be maintained between the respective races of each bearing through their associated balls 42 and 52. The invention accordingly provides for continuously applying axial thrust loads to the two races of each bearing to maintain these desired conditions. Referring to Fig. 3, which shows the parts with the cap screws 23 in loosened condition, it will be noted that there is a clearance at 67 between the ring 25 and the holder 22, which is established by the relative positioning of the parts established by the shoulder 45, and the flanges 36 and 55. The inner face of plate 30 is recessed radially outward so as to provide a clearance 68 between the plate 30 and the race 40 of the inner anti-friction bearing. The clearance 68 which is greater than the amount of inherent deflection in the anti-friction bearing is established by the relative positioning of the ring member 33, holder 22 and the pilot portion 44 of the holder. Care must be taken to insure a precise but adequate clearance 68 in order not to impose axial thrust on the race member 40 yet not detrimentally affecting the sealing characteristics of the plate 30. When the cap screws 23 are tightened to bring the ring 25 into engagement with holder 22 as shown in Fig. 1, the parts are stressed, especially the outer ring 25, the ring member 33 and the anti-friction bearings, in such manner as to impart the desired axial thrust load to the outer race of each bearing with respect to its complementary inner race. The loading of the races can be more specifically described as follows: the tightening of the cap screws 23 moves the ring 25 towards engagement with the holder 22 substantially closing the clearance 67; the axial displacement of ring 25 imparts through flange 55 an axial thrust load to the outer race 51 of the outer anti-friction bearing which thrust is in turn imparted through the balls 52 to the inner race 50 and thence to the shoulder 36 of the ring member 33; the thrust on the ring member 33 moves it towards the holder 22 causing it to take up a portion of the clearance 67 in an amount substantially equal to the inherent deflection contained in the bearings; the axial movement of the ring member 33 is transferred to the plate 30 because of its being joined to the ring 33 by the screw means 34, thus causing the portion of the face of the plate 30 radially adjacent the recess 68 to compressively abut the outer race 41 of the inner anti-friction bearing; the axial thrust exerted on the race 41 is in turn imparted through the balls 42 to the inner race 40 and the thrust thus applied to the inner race 40 is opposed by the race's engagement of the shoulder 45 of the holder 22. As a result, the balls 42 and 52 are continuously loaded into the desired maintained electrical engagement with both of their associated races at all times.

The attachment of the invention is not limited to the specific type of electromagnetic clutch shown in Fig. 1 but is applicable to a wide variety of electromagnetic clutches irrespective of the specific means employed by the clutch for effecting driving connection between its two main parts. This is specifically illustrated by Fig. 4, which shows an attachment of the same construction described in connection with Figs. 1–3 mounted on the magnet body 70 of an electromagnetic disk clutch, as indicated by the disk 71 and the spider 72 attached to the driven gear 73. The individual construction of the clutch 70–72 is not material to the invention, and it will be apparent that the invention is equally useful whether the clutch employs single or multiple disks or any other form of friction member for effecting the driving connection between the two clutch parts when the clutch is engaged.

While the forms of apparatus therein described constitute preferred embodiments of the invention, it is to be understood that this invention is not limited to these precise forms of apparatus and that changes may be made therein without departing from the scope of the invention which is defined in the appended claims.

What is claimed is:

1. Apparatus for transmitting energizing current through the operating coil of the rotating magnet body of an electromagnetic clutch, comprising a holder adapted for mounting on the magnet body for rotation therewith, a pair of anti-friction bearings carrying substantially no radial load on said holder each including complementary races of electrically conducting material having anti-friction elements of electrically conducting material therebetween, means securing one of said races of each of said bearings to said holder for rotation therewith, stationary mounting means adjacent said holder, means securing other races of each of said bearings to said stationary mounting means, and means mainting said bearings electrically insulated from each other, means electrically connecting said rotating races to opposite ends of the magnet coil respectively, a pair of electrical leads, and means for connecting said leads to the respective other races of each of said bearings.

2. Apparatus for transmitting energizing current through the operating coil of the rotating magnet body of an electromagnetic clutch, comprising a holder adapted for mounting on the magnet body for rotation therewith, a pair of anti-friction bearings arranged in concentric relation on said holder and each including complementary races of electrically conducting material having anti-friction elements of electrically conducting material therebetween, means securing one of said races of each of said bearing to said holder for rotation therewith, stationary mounting means adjacent said holder, means securing other races of each of said bearings to said stationary mounting means, means maintaining said bearings electrically insulated from each other, means electrically connecting said rotating races to opposite ends of the magnet coil respectively, a pair of electrical leads, and means for connecting said leads to the respective other races of each of said bearings.

3. Apparatus for transmitting energizing current through the operating coil of the rotating magnet body of an electromagnetic clutch, comprising a holder adapted for mounting on the magnet body for rotation therewith, a pair of anti-friction bearings arranged in concentric relation on said holder and each including radially inner and outer races of electrically conducting material having anti-friction elements of electrically conducting material therebetween, means securing the radially outermost and innermost of said races to said holder for rotation therewith with respect to the intermediate two of said races, stationary means securing said intermediate two races together in electrically insulated relation, means electrically connecting said rotating races to opposite ends of the magnet coil respectively, a pair of electrical leads, and means for connecting said leads to said other two races respectively.

4. Apparatus for transmitting energizing current through the operating coil of the rotating magnet body of an electromagnetic clutch, comprising a holder adapted for mounting on the magnet body for rotation therewith, a pair of anti-friction bearings carrying substantially no radial load on said holder each including complementary races of electrically conducting material having anti-friction elements of electrically conducting material therebetween, means securing one of said races of each said bearing to said holder for rotation therewith, stationary mounting means adjacent said holder, means securing other races of each of said bearings to said stationary mounting means, means maintaining said bearings electrically insulated from each other, means electrically connecting said rotating races to opposite ends of the magnet coil respectively, a pair of electrical leads, means for connecting said leads to the respective other races of each of said bearings, and means continuously axially stressing a said race of each said bearings with respect to its complementary race to maintain said races in electrical contact with the associated said anti-friction elements.

5. Apparatus for transmitting energizing current through the operating coil of the rotating magnet body of an electromagnetic clutch, comprising a holder adapted for mounting on the magnet body for rotation therewith, a pair of anti-friction bearings arranged in concentric relation on said holder and each including radially inner and outer complementary races of electrically conducting material having anti-friction elements of electrically conducting material therebetween, means securing the radially outermost and innermost of said races to said holder for rotation therewith with respect to the intermediate two of said races, stationary means securing said intermediate two races together in electrically insulated relation, means electrically connecting said rotating races to opposite ends of the magnet coil respectively, a pair of electrical leads, means for connecting said leads to the respective other races of said bearings, and means operably and adjustably joined to said holder continuously applying an axial thrust load on one of said races of each of said bearings with respect to the complementary said race to maintain said races in electrical contact with the associated said anti-friction elements.

6. Apparatus for transmitting energizing current through the operating coil of the rotating magnet body of an electromagnetic clutch, comprising a holder adapted for mounting on the magnet body for rotation therewith, a pair of respectively inner and outer anti-friction bearings arranged on said holder in concentric relation and each including radially inner and outer complementary races of electrically conducting material having anti-friction elements of electrically conducting material therebetween, stationary means securing said outer race of said inner bearing and said inner race of said outer bearing together in electrically insulated relation, a pair of electrical leads, means connecting said leads respectively to said outer race of said inner bearing and said inner race of said outer bearing, means securing the other two of said races to said holder for rotation therewith, and means electrically connecting said other two races to the opposite ends of the magnet coil respectively.

7. Apparatus for transmitting energizing current through the operating coil of the rotating magnet body of an electromagnetic clutch, comprising a holder adapted for mounting on the magnet body for rotation therewith, a pair of respectively inner and outer anti-friction bearings arranged on said holder in concentric relation and each including radially inner and outer complementary races of electrically conducting material having anti-friction elements of electrically conducting material therebetween, a stationary member, means securing said outer race of said inner bearing and said inner race of said outer bearing to said stationary member in electrically insulated relation, a pair of electrical leads carried by said stationary member, means connecting said leads respectively to said outer race of said inner bearing and said inner race of said outer bearing, means securing the other two of said races to said holder for rotation therewith, and means electrically connecting said other two races to the opposite ends of the magnet coil respectively.

8. Apparatus for transmitting energizing current through the operating coil of the rotating magnet body of an electromagnetic clutch, comprising a holder adapted for mounting on the magnet body for rotation therewith, a pair of respectively inner and outer anti-friction bearings carrying substantially no radial load arranged on said holder in concentric relation and each including radially inner and outer complementary races of electrically conducting material having anti-friction elements of electrically conducting material therebetween, a stationary member, means securing said outer race of said inner bearing and said inner race of said outer bearing to said stationary member in electrically insulated relation, a pair of electrical leads carried by said stationary member, means connecting said leads respectively to said outer race of said inner bearing and said inner race of said outer bearing, means securing the other two of said races to said holder for rotation therewith, means electrically connecting said other two races to the opposite ends of the magnet coil respectively, and means cooperating with said holder and said stationary member to apply a continuous axial thrust load on one of said races of each of said bearings with respect to the complementary said race and thereby to maintain said races in electrical contact with the associated said anti-friction elements.

References Cited in the file of this patent

UNITED STATES PATENTS

| | | |
|---|---|---|
| 1,787,225 | Wittkuhns | Dec. 30, 1930 |
| 1,999,303 | Sarbey | Apr. 30, 1935 |
| 2,502,252 | Faile | Mar. 28, 1950 |